A. L. BISHOP.
FASTENING DEVICE.
APPLICATION FILED DEC. 27, 1918.

1,352,243.　　　　　　　　　　　　　Patented Sept. 7, 1920.

WITNESS:
Thos. W. Riley

INVENTOR.
Ashley L. Bishop
BY Wm H Babcock & Son
ATTORNEYS

UNITED STATES PATENT OFFICE.

ASHLEY L. BISHOP, OF BRISTOL, CONNECTICUT, ASSIGNOR TO THE STEEL PRODUCTS COMPANY, OF HARTFORD, CONNECTICUT, A CORPORATION OF CONNECTICUT.

FASTENING DEVICE.

1,352,243.  Specification of Letters Patent.  Patented Sept. 7, 1920.

Application filed December 27, 1918. Serial No. 268,521.

*To all whom it may concern:*

Be it known that I, ASHLEY L. BISHOP, a citizen of the United States, residing at Bristol, in the county of Hartford and State of Connecticut, have invented certain new and useful Improvements in Fastening Devices, of which the following is a specification.

This invention relates to fastening devices intended more particularly by me for use as part of an anti-skidding or traction unit of the anchored or fixed point type for motor truck wheels, especially to that type of such devices employing a pin or bolt and resides especially in the special construction of the pin and the means for locking the same in position.

The chief objects are to provide a pin for such devices of uniform diameter from end to end, excepting for an annular groove near its lower end, without head or tip, in order that it may be formed from ordinary commercial stock simply by cutting off the requisite length, grooving and applying the stop pin, thereby greatly reducing the cost of manufacture of such devices and resulting in the conservation of much metal, while making it possible to turn out a much larger number of such pins with a given apparatus in a given time than heretofore; and to provide a catch to retain said pin in normal position, which catch is provided with means for locking it in normal position against jars and other actions and forces tending to accidentally displace it, but which yields to intentional intelligently applied force, and is so formed and mounted in relation to a relatively fixed part that it cannot be moved beyond a certain point, thereby guarding against its flying outward in its movement at right angles to said fixed object during the rotation of the wheel and being so damaged by the walls of ruts or objects on the road as to make it impossible to move said catch back into normal position again.

Other objects are to provide means for easily moving the pin out of normal position when released by the catch and to so form the part in which the catch is mounted that there will be no opportunity for foreign matter to lodge therein and interfere with the proper operation and easy working of the catch, all of which objects, among others, are accomplished by the construction, combination and arrangement of parts all as hereinafter more particularly set forth, described and claimed.

Figure 1:
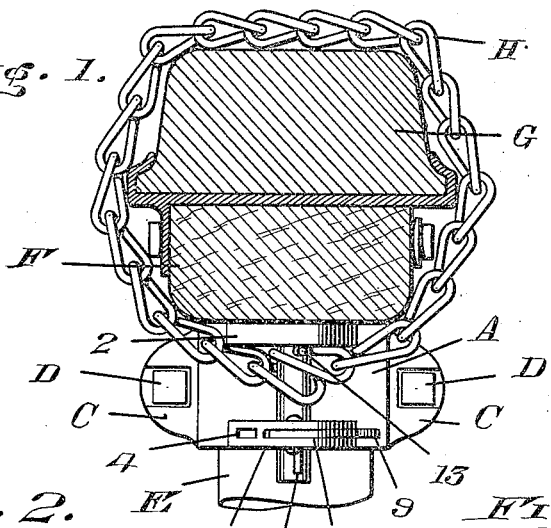
Figure 2:
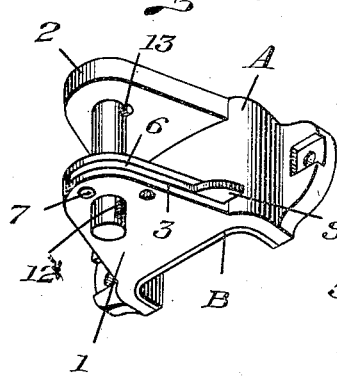
Figure 4:
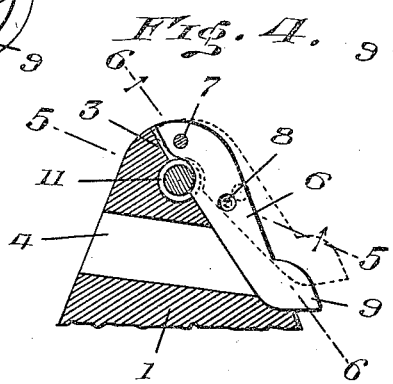
Figure 3:
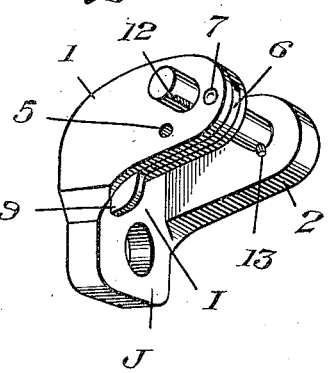
Figure 5:
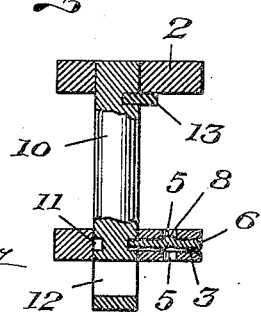
Figure 6:
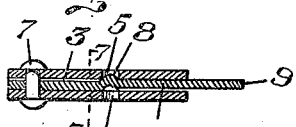
Figure 7:
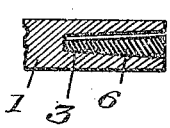

In the accompanying drawings:

Figure 1 represents a front elevation of a clamp applied to a spoke of a wheel and embodying my invention;

Fig. 2, a perspective view of the front or primary plate of said clamp, said plate embodying my invention;

Fig. 3, a similar view of a modified form of plate, being a cleat to be applied, for instance, to the side face of a disk wheel;

Fig. 4, a horizontal sectional view, broken away, taken through the lower flange of the primary plate in the plane of the catch and looking upward, showing the catch in normal position in solid lines and in open position in dotted lines;

Fig. 5, a vertical sectional view on the line 5—5 of Fig. 4;

Fig. 6, a similar view on the line 6—6 of Fig. 4;

Fig. 7, a similar view on the line 7—7 of Fig. 6.

Referring now in detail to the drawings, A indicates the front plate of a two plate clamp having a rubber treated lining B and provided with perforated end flanges C for the reception of bolts D on which nuts are to be turned to draw the two plates together on the outer portion of a spoke E of the wheel with the flange 2 of plate A adjacent the inner face of the felly F, on which is mounted the tire G. H indicates one of the transverse traction or anti-skidding chains of the fixed point or anchored type.

The plate A is provided with two parts or flanges 1 and 2, preferably, though not necessarily, integral therewith and preferably parallel to each other. Each flange is perforated as shown in Fig. 5, the perforations being of the same diameter and having a common axial line.

The flange 1 is provided with a lateral horizontal slot or recess 3 extending at 4 entirely through the flange 1 to allow the escape of foreign matter to prevent the slot 3 from becoming clogged up, and has a vertical bore 5 communicating with said slot 3, and a hole in its outer portion extending through said slot 3.

A keeper 6 is mounted in said slot 3 by means of a rivet 7 passing through the above mentioned hole and is provided with a depressed lug 8 snapping into the bore 5 above mentioned. This keeper is formed of resilient metal and is slightly deformed or twisted in forming the lug 8, as illustrated in Fig. 6, so that it bears against the lower wall of the slot 3 near its outer end and against the upper wall of slot 3 near its inner end, obtaining a good frictional engagement and forcing said lug 8 in said bore 5 as the catch is moved to normal position and firmly holding said lug 8 in said bore 5, preventing the accidental displacement of the said catch.

The outer end and the side edges of said catch preferably are flush with the edges of the flange 1, excepting at the inner end portion of said catch 6, at which point it is provided with a projection 9 to be engaged by a screw-driver or other convenient tool to force it into open position, indicated by dotted lines in Fig. 4.

The inner wall of the slot 3 at its outer end portion is preferably straight, as is the outer end portion of the inner edge of the catch 6, which edge portion of said catch preferably lies parallel to the inner wall of the outer portion of slot 3 when the catch is in normal position, and the rivet 7, forming the fulcrum for the catch 6 is so positioned with relation to the inner wall of the slot 3 that when said catch 6 is moved thereon outwardly the tip of the outer portion of its inner edge will abut against the corresponding portion of the inner wall of slot 3, as shown in dotted lines in Fig. 4, thereby preventing the further opening movement of said catch.

The inner edge of said catch 6 is also provided with a cam-face normally extending into the perforation in said flange 1 as shown in Fig. 4 in solid lines, but lying outside thereof when the catch is in open position, as shown in dotted lines in said figure.

The pin 10 is of uniform diameter throughout, except near its lower end, where it is provided with an annular groove 11, and is of such size as to be snugly received by the perforations in the flanges 1 and 2. Also, in its lower end portion it may be provided with a longitudinal slot 12, as shown, for the reception of a nail, screw-driver or the like to give a handle to pull the pin outward in case it should become stuck in said perforations.

In its upper end portion it is laterally recessed to receive a stop pin 13, which prevents the separation of the pin from the plate after assembly.

To assemble, the catch 6 is first mounted in slot 3 of flange 1, the pin 10 is then passed upward through the perforation in plate 1, the stop pin 13 is then inserted in the recess 12 and assembly is complete.

The location of the stop pin 13 on the pin 10 with relation to the groove 11 thereof and the flanges 1 and 2 is such that when the stop pin 13 engages the lower face of the flange 2 the annular groove 11 of the pin 10 will lie in the plane of the slot 3 so as to receive the catch 6 located in said slot, as shown.

In operation, the terminal links of the chain H will be slipped, successively, over the upper end of the pin 10, which will then be moved toward flange 2 until its upper portion is received by the perforation in said flange and its stop pin 13 is in engagement with the lower face of the said flange 1, when the catch 6 will be moved to normal position, extending into the groove 11 of the pin 10 and preventing longitudinal movement thereof.

To remove the chain it is but necessary to pry the catch 6 open, remove the terminal links from the pin 10 and then repeat the above described operation.

In order to obtain ease in the working of the catch 6, the upper and lower walls of the slot 3 flare laterally outwardly and the catch 6 is correspondingly formed in wedge-shape in lateral cross-section, so that a very slight movement suffices to disengage the faces of said catch from the walls of said slot, allowing the catch to be moved freely without impediment on its fulcrum, this construction being shown in Fig. 7.

In the modification illustrated in Fig. 3, the construction and operation of the device are the same as in the above described preferred form, excepting that they are embodied in a slightly different form of plate I intended to be used as a cleat to be attached to the side of a metal disk wheel having its outer portion near its felly curved or arcuate in form, and to this end, instead of having two perforated end flanges, it has a perforated lateral flange J and is to be mounted on the wheel by means of a bolt, not shown, adapted to pass through said perforation and into or through the disk wheel, not shown.

The pin 10 may secure the terminal portions of the chain in the plate by receiving the terminal links thereof, as above described, or may secure them therein in any other suitable manner.

Having thus described my invention, what I claim as new and desire to secure by Letters Patent is:

1. Two relatively fixed perforated parts, in combination with an element having portions normally located in the perforations of said parts, said element being provided with an annular groove and a stop limiting the movement of said element and being in engagement with one of said parts when the annular groove is in normal position with relation to the other of said parts, and a catch pivotally mounted with relation to the latter part and in normal position extending into the annular groove of said element, and provided with means coöperating with a fixed part to lock said catch in normal position against accidental displacement, and means limiting the pivotal movement of said catch.

2. Two relatively fixed perforated parts, one of said parts having a slot wedge shape in cross-section, in combination with an element having portions normally located in the perforations of said parts, said element being provided with an annular groove and a stop limiting the movement of said element in both longitudinal directions and being in engagement with one of said parts when the annular groove is in normal position with relation to the slotted part, which part is also formed with an abrupt edge, a catch pivotally mounted in said slotted part and in normal position extending into the annular groove of said element and having a lug snapping into position behind said edge, and means limiting the pivotal movement of said catch.

3. Two relatively fixed perforated parts, one of said parts having a slot wedge shape in cross section and provided with a bore extending through said slot, in combination with an element having portions normally located in the perforations of said parts, said element being provided with a groove, means limiting the movement of said element in both longitudinal directions, a catch of resilient material pivotally mounted in said slotted part and in normal position extending into the groove of said element and having a lug snapping into the bore in said slotted part, said catch being wedge-shape in cross section.

4. A part formed with a perforation and having a slot extending toward and at an angle to said perforation, and an element having a portion located normally in said perforation, said portion being provided with a recess, in combination with a catch pivotally mounted in said slot and provided with means for locking it in normal position, said catch being of resilient material and distorted in shape in such manner that it bears with one face for a portion of its length against one wall of the slot and with its opposite face for a portion of its length against the opposing wall of said slot.

5. A part formed with a perforation and having a slot communicating with said perforation, and a pin having an annular groove and being otherwise of substantially uniform diameter from end to end to move, with a good fit, through said perforation, in combination with a catch pivotally mounted in said slot and normally extending into the annular groove of said pin, and means limiting the outward pivotal movement of said catch, said catch being formed of resilient material and said part and catch being formed with interengaging parts locking said catch in normal position against accidental displacement.

6. A part having a perforation and provided with a slot communication with said perforation and at one portion extending entirely through said part to permit the escape of foreign matter, and an element having an annular slot in its portion normally located in the perforation on said part, in combination with a catch mounted for movement in said slot and having a part in normal position extending into the groove of said element.

7. Two relatively fixed parts, one of said parts being perforated and the other part being adapted to receive the end portion of the element hereinafter referred to, one of said parts being slotted, in combination with an element adapted to have movement in the perforated part, having some portion at all times located in the perforation thereof and having an end portion normally received by the other part, said element having an annular groove, a catch pivotally mounted in the slotted part and normally extending through a portion thereof into the groove of said element, means for locking said catch in normal position and means for limiting its outward movement.

8. Two relatively fixed parts, one of said parts being perforated and the other part being adapted to receive the end portion of the element hereinafter referred to, one of said parts being slotted, in combination with an element adapted to have movement through the perforated part, having some portion at all times located in the perforation thereof, having an end portion normally received by the other part, formed with an annular groove and provided with a stop so located thereon with relation to the groove as to engage a relatively fixed object when the groove is in correct position, a catch pivotally mounted in the slotted part and normally extending through a portion thereof into the groove of said element, and means for locking said catch in normal position against accidental displacement.

In testimony whereof I have signed my name to this specification in the presence of two subscribing witnesses.

ASHLEY L. BISHOP.

Witnesses:
E. L. SCHULTZ,
WARREN D. CHASE.